United States Patent [19]
Sugiyama et al.

[11] Patent Number: 4,646,103
[45] Date of Patent: Feb. 24, 1987

[54] OPTICAL RECORDING METHOD

[75] Inventors: Hisataka Sugiyama, Kokubunji; Kazuo Shigematsu, Saitama; Takeshi Maeda, Kokubunji; Atsushi Saitoh, Ichikawa; Wasao Takasugi, Higashiyamato, all of Japan

[73] Assignee: Hitachi, Ltd., Tokyo, Japan

[21] Appl. No.: 832,887

[22] Filed: Feb. 26, 1986

[30] Foreign Application Priority Data

Mar. 20, 1985 [JP] Japan .................................. 60-54438
Mar. 22, 1985 [JP] Japan .................................. 60-55832

[51] Int. Cl.$^4$ .................... G01D 15/14; G11B 21/10; G11B 7/00
[52] U.S. Cl. ............................. 346/1.1; 346/76 L; 346/108; 358/297; 369/32; 369/44; 369/54; 369/116
[58] Field of Search ...................... 346/1.1, 76 L, 108; 358/297; 369/32, 44, 54, 116

[56] References Cited

U.S. PATENT DOCUMENTS

| 4,397,010 | 8/1983 | Nabeshima | 369/44 |
| 4,416,002 | 11/1983 | Oguino et al. | 369/44 |
| 4,419,750 | 12/1983 | Howe | 369/111 |
| 4,483,262 | 5/1983 | Noguchi | 346/1.1 |
| 4,488,277 | 12/1984 | McFarlane et al. | 369/48 |
| 4,545,044 | 10/1985 | Satoh et al. | 369/32 |
| 4,583,210 | 4/1986 | Winslow | 369/54 |

Primary Examiner—E. A. Goldberg
Assistant Examiner—Gerald E. Preston
Attorney, Agent, or Firm—Antonelli, Terry & Wands

[57] ABSTRACT

In an optical recording system wherein the intensity of a laser beam is modulated with an input modulation signal so as to record information on a recording medium, the intensity modulation of the laser beam is performed after the pulse waveform of the input modulation signal is converted into two pulses which express the front edge and rear edge of the pulse waveform respectively.

4 Claims, 22 Drawing Figures

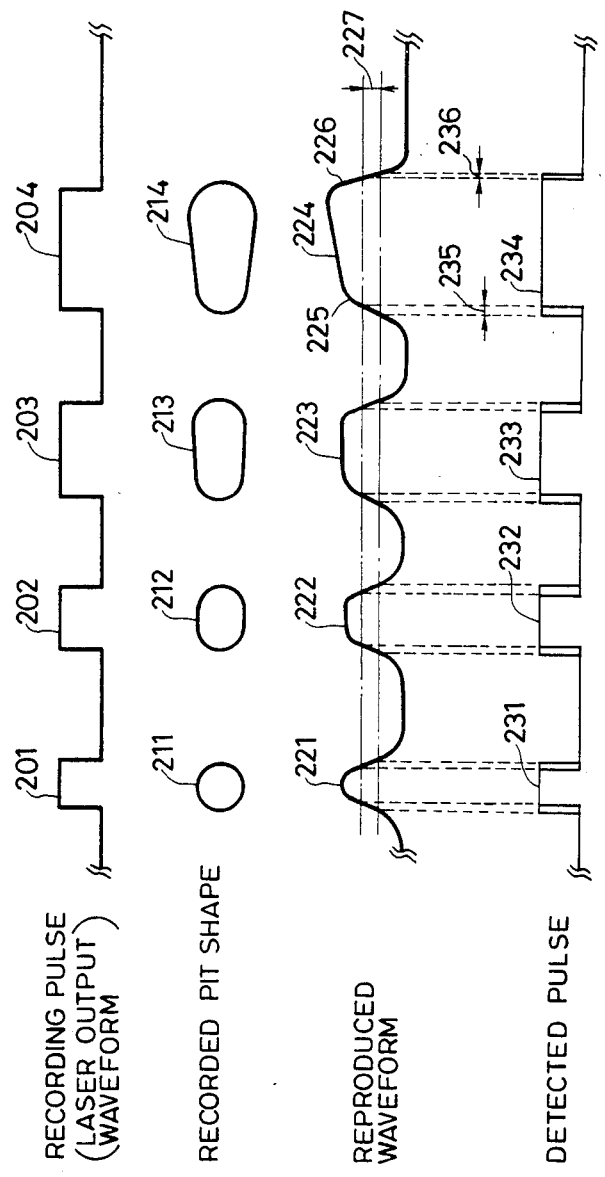

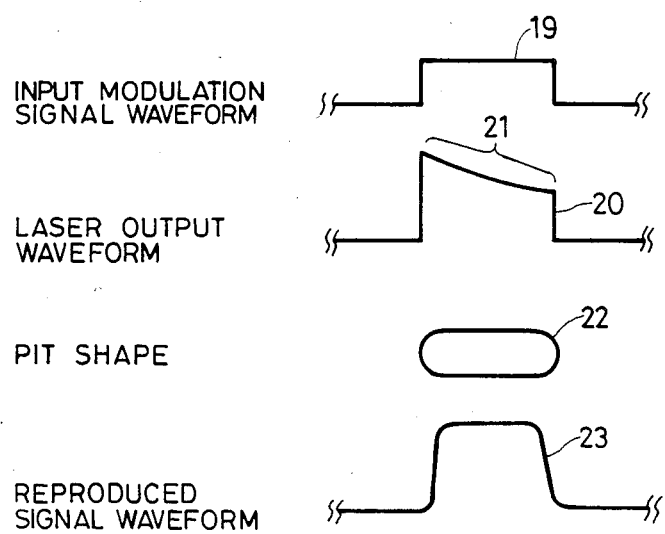

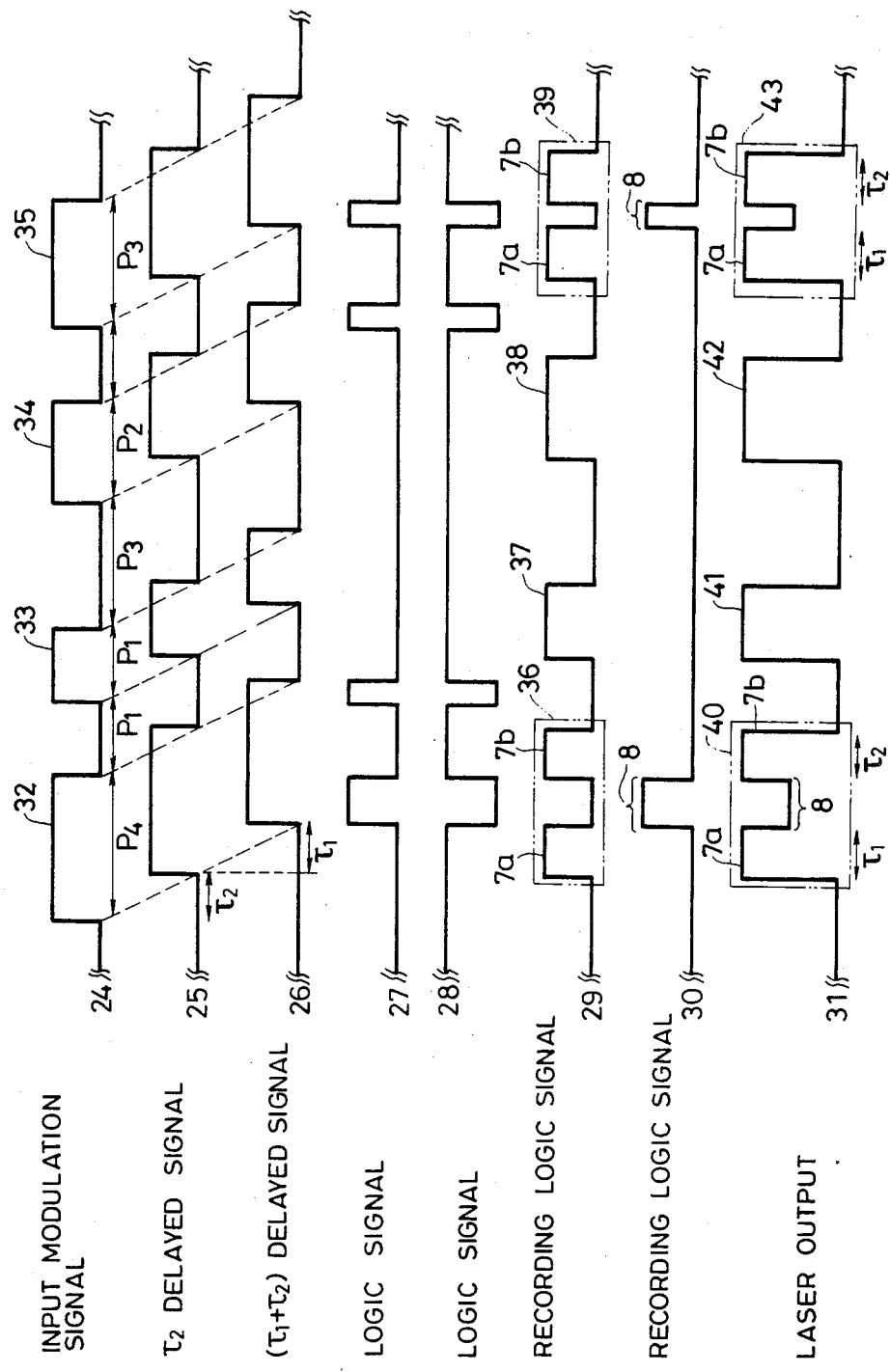

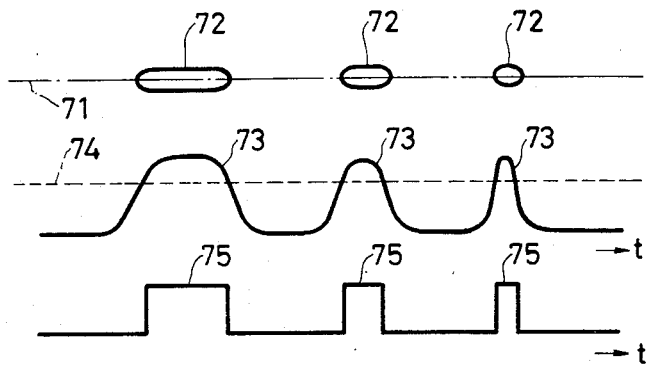
FIG. 6A
FIG. 6B
FIG. 6C
FIG. 7
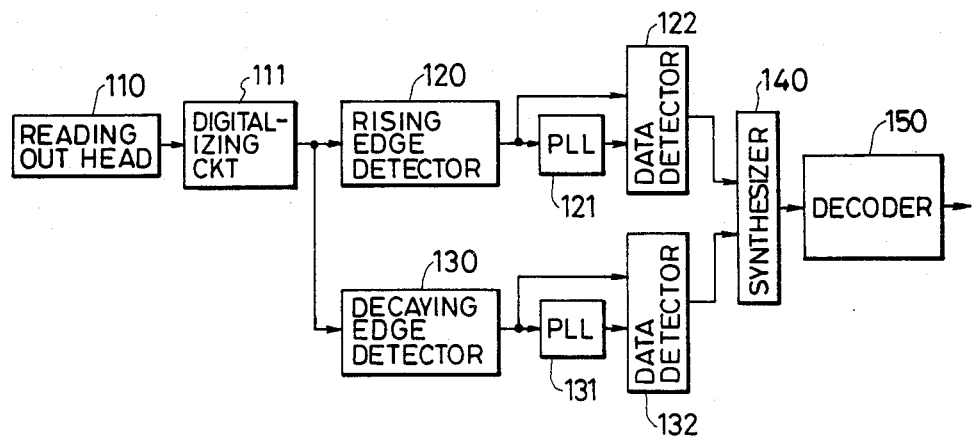
FIG. 8A
FIG. 8B
FIG. 8C
FIG. 8D FIG. 9
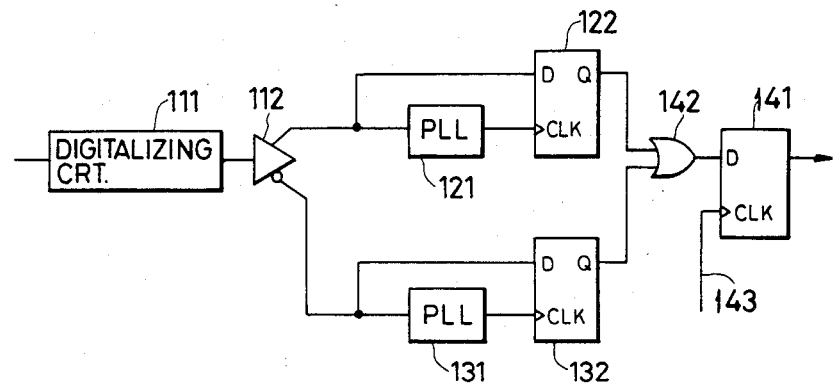
FIG. 10
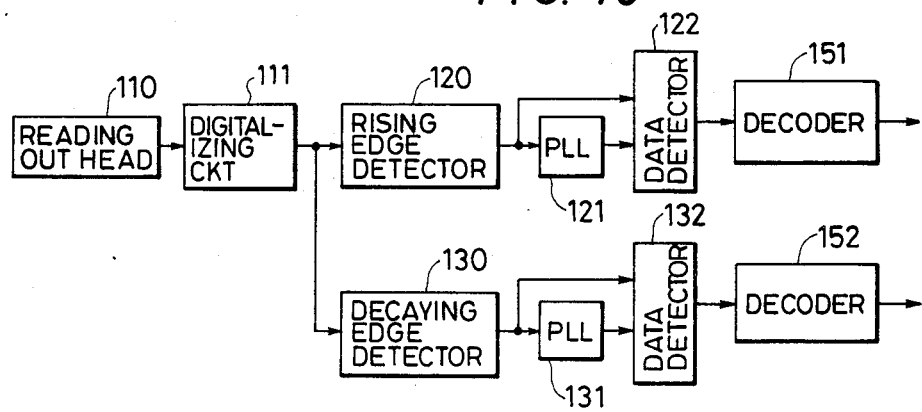
FIG. 11A
FIG. 11B
FIG. 11C
FIG. 11D
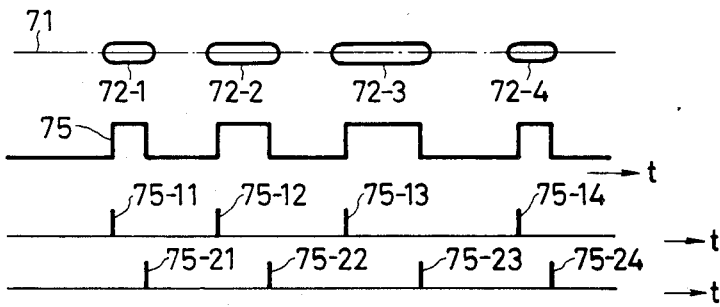

OPTICAL RECORDING METHOD

BACKGROUND OF THE INVENTION

The present invention relates to a method of optically recording data, and more particularly to a recording method which is well suited to record signals utilizing the rise and decay of pulses for data, on a recording medium such as optical disc.

In an information recording and reproducing system which exploits the recording and reproducing principles of an optical disc, information is recorded by changing the optical or magnetic property of the medium at parts thereof. The recording and reproducing system of this type is described in, for example, 'Philips technical review', Vol. 40, 1982, No. 6, pp. 157–164.

Heretofore, in case of recording a modulation signal utilizing the rise and decay of pulses for data, for example, a signal such as the NRZI code on a recording medium such as optical disc, the intensity of a laser beam has been modulated with the modulation signal itself. That is, a laser output has been switched with the rise and decay of the logic of an input signal code.

In an optical disc system, information is recorded by exploiting the thermal property of a recording medium. Points on the recording medium corresponding to the rise and decay of a recording pulse are the front edge and rear edge parts of a pit or magnetic domain formed by the recording pulse, respectively. As regards the temperatures of the front edge and rear edge parts at the step of forming the pits or magnetic domains, the temperature of the rear edge part becomes higher than that of the front edge part due to the effect of thermal diffusion. For this reason, as the pulse widths of the recording pulses or laser output waveforms increase as shown by waveforms 201, 202, 203 and 204 in FIG. 1, the influence of the effect of thermal diffusion manifests itself, and the pits or magnetic domains become shapes expanded at the rear edge parts as seen from pits or domains 213 and 214. Here, when note is taken of a reproduced waveform 224 obtained from the pit or domain 214, the rising waveform 225 and decaying waveform 226 of the reproduced waveform 224 are not symmetric. When such an asymmetric reproduced waveform 224 is passed through a level slicer with the intention of detecting the recording pulse width, an error develops because the variation 235 of the front edge and that 236 of the rear edge of a detected pulse 234 become unequal with respect to the shift 227 of a slice level. That is, when the recording pluse widths are detected from the asymmetric reproduced waveforms, the probability of occurrence of errors rises, and a high reliability is not attained.

In FIG. 1, numerals 211, 212, 213 and 214 designate the shapes of pits or magnetic domains formed by the recording pulses 201, 202, 203 and 204 respectively, numerals 221, 222, 223 and 224 designate reproduced waveforms obtained from these pits or domains respectively, and numerals 231, 232, 233 and 234 designate pulses detected from these reproduced waveforms respectively.

Meanwhile, in the production of discs dedicated to reproduction such as a compact disc and a laser disc, the photoetching process is employed for forming pits. According to this process, the shapes of the pits are determined by irradiation energy density profiles only. When the front and rear edges of the pits are given symmetric irradiation energy density profiles, they become symmetric without incurring the problem of the asymmetry of the edges of the pits.

In the optical disc system wherein information is recorded by exploiting the thermal property of the recording medium, there has already been proposed a recording method in which the waveform of a recording pulse is converted into a waveform with the effect of thermal diffusion considered in advance, whereupon a reproduced waveform of excellent symmetry is obtained from a pit or magnetic domain formed by the use of the converted waveform. This proposal is described in the official gazette of Japanese Patent Application Laid-open No. 60-25032.

The proposed method is illustrated in FIG. 2. In this method, a current source circuit for driving a laser is furnished with a differentiation circuit which consists of a capacitor C and a resistor R. In response to a rectangular input modulation signal waveform 19, a laser output waveform 20 is prepared the pulse height 21 of which attenuates exponentially in accordance with a time constant C·R. This waveform 20 is used as a recording pulse. That is, a laser beam intensity at the rear end part of the recording pulse is made lower than that at the front end part of the recording pulse, thereby to establish a uniform temperature profile from the front edge to the rear edge of a pit or magnetic domain. Therefore, the pit or domain 22 of good symmetry is formed, and a reproduced signal waveform 23 of good symmetry is obtained.

With this method, however, the optimum time constant C·R for the thermal diffusivity of a recording medium (recording film) must be set. In this regard, the time constant C·R cannot be conformed to a dispersion in the thermal diffusivity of the recording film attributed to the fluctuations of conditions for preparing the recording film. This method therefore has the disadvantage that the pits or magnetic domains of good symmetry cannot be always formed stably.

SUMMARY OF THE INVENTION

An object of the present invention is to provide an optical recording method of high reliability which affords reproduced waveforms having rises and decays of good symmetry at all times.

According to the present invention, a recording pulse of great pulse width which exerts the influence of thermal diffusion much is formed of two pulses of small pulse widths which represent the front edge part and rear edge part of a modulation signal pulse respectively, in order to nullify the effect of thermal diffusion otherwise arising from the front edge part to the rear edge part of a pit or magnetic domain. That is, the recording pulse is composed of the two pulses which are spaced at a certain time interval and which correspond to the front edge part and rear edge part of the modulation signal pulse respectively. Recording with such two recording pulses (laser output waveforms) forms two separate pits or magnetic domains of equal pit or domain widths.

In a case where the spacing between the two pits or magnetic domains (namely, a spatial separation corresponding to the time interval between the two recording pulses) is shorter than the optical resolution of a reproducing light beam, that recess in a reproduced waveform which corresponds to the spacing between the two pits or domains lies at a level higher than a slice level. Thus, in this case, the two pits or magnetic domains are reproduced as a single continuous pit or domain.

In a case where the spacing between the two pits or magnetic domains is not shorter than the optical resolution of the reproducing light beam, a laser output at a degree at which the influence of thermal diffusion is not exerted on the rear edge part of the rear pit is applied between the two recording pulses, or alternatively, one or more pulses of small pulse widths are inserted between the two recording pulses. The interval between the adjacent ones of these pulses is set at such a value that the spacing between the adjacent ones of pits or magnetic domains to be formed by these pulses becomes shorter than the optical resolution of the reproducing light beam. In this way, the recesses of a reproduced waveform corresponding to the spaces between the pits or magnetic domains are hold at a level higher than the slice level, so that the plurality of pits or domains are reproduced as a single continuous pit or domain.

According to the present invention, the symmetry of those rises and decays of reproduced waveforms which correspond to the front edges and rear edges of recording signal pulses respectively can be improved. Therefore, in a case where recording signals utilizing the rises and decays of pulses for data are recorded and reproduced on and from a recording medium, errors can be lessened to attain a high reliability.

BRIEF DESCRIPTION OF THE DRAWINGS

In the accompanying drawings;

FIG. 1 is a diagram showing recording pulses as well as the shapes of pits formed thereby, and reproduced signal waveforms obtained from the pits;

FIG. 2 is a diagram for explaining a prior-art recording method;

FIG. 4 is a time chart for explaining the operation of a circuit which performs the present invention;

FIGS. 6A, 6B and 6C are diagrams for explaining an information reproducing process;

FIG. 7 is a block diagram for explaining a first embodiment of a signal reproducing method;

FIGS. 8A, 8B, 8C and 8D are diagrams for explaining the operations of circuit blocks in FIG. 7;

FIG. 9 is a diagram showing the practicable arrangements of circuit blocks in FIG. 7;

FIG. 10 is a block diagram for explaining a second embodiment of the signal reproducing method; and FIGS. 11A, 11B, 11C and 11D are diagrams for explaining a third embodiment of the signal reproducing method.

DETAILED DESCRIPTION OF PREFERRED EMBODIMENTS

Figure 3A:
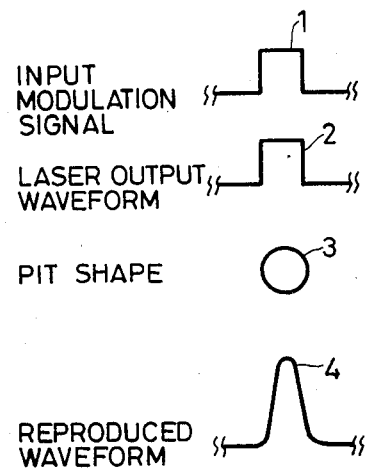
FIGS. 3A, 3B, 3C and 3D are diagrams for explaining embodiments of the present invention.

Now, embodiments of the present invention will be described in detail. In the embodiments of the present invention, as regards a recording pulse of great pulse width which exerts an intense influence of thermal diffusion in forming a pit or domain, the front edge part and rear edge part thereof are respectively formed by pulses of small pulse widths, and a time interval is set between both the pulses. Thus, the influence of thermal diffusion on the rear edge side is nullified. More specifically, as shown in FIG. 3B, as to an input modulation signal 5, pulses 7a and 7b are formed in correspondence with the front edge and rear edge thereof, and a time interval 8 is set between both the pulses. Two pits or domains are formed by the laser output of this pulse train 6. In this case, when the pulse width of the input modulation signal increases more, the pulse interval 8 of the pulse train 6 lengthens, and the recess 11 of a reproduced signal waveform 10 enlarges to become lower than a slice level. As shown in FIG. 3C, therefore, a laser output 12 is applied also during the pulse interval 8 to the extent that the rear edge part of the rear pit is not intensely affected by the thermal diffusion. Alternatively, as shown in FIG. 3D, a laser output waveform 15 is employed in which one or more pulses 16 are inserted in the pulse interval 8. In this way, the level of the central part of the reproduced signal waveform is prevented from lowering.

Figure 3B:
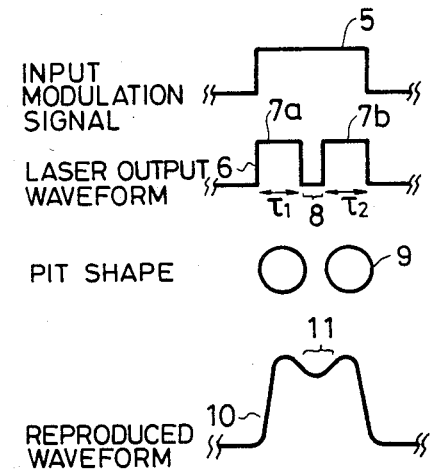
Figure 3C:
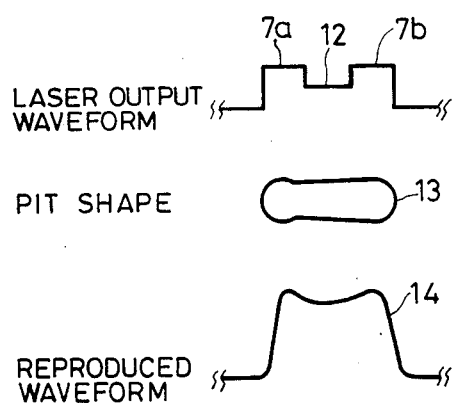
Figure 3D:
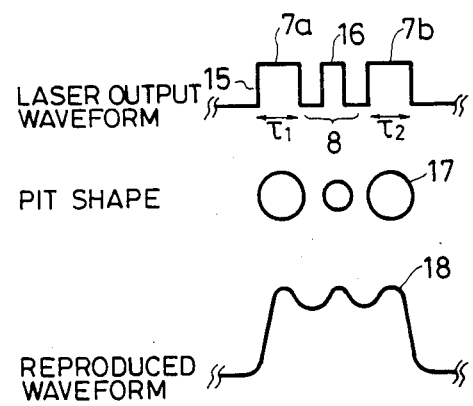

As to an input modulation signal 1 having a small pulse width (little exerting the influence of thermal diffusion) adapted to form a small pit or domain 3 which affords a waveform with a front edge and a rear edge of good symmetry as a reproduced waveform 4 shown in FIG. 3A, the waveform of the signal left intact is used as a laser output waveform 2. In contrast, as to the input modulation signal 5 having the great recording pulse width, a laser output waveform 6, 12 or 15 as shown in FIGS. 3B, 3C or 3D is used.

Figure 5:
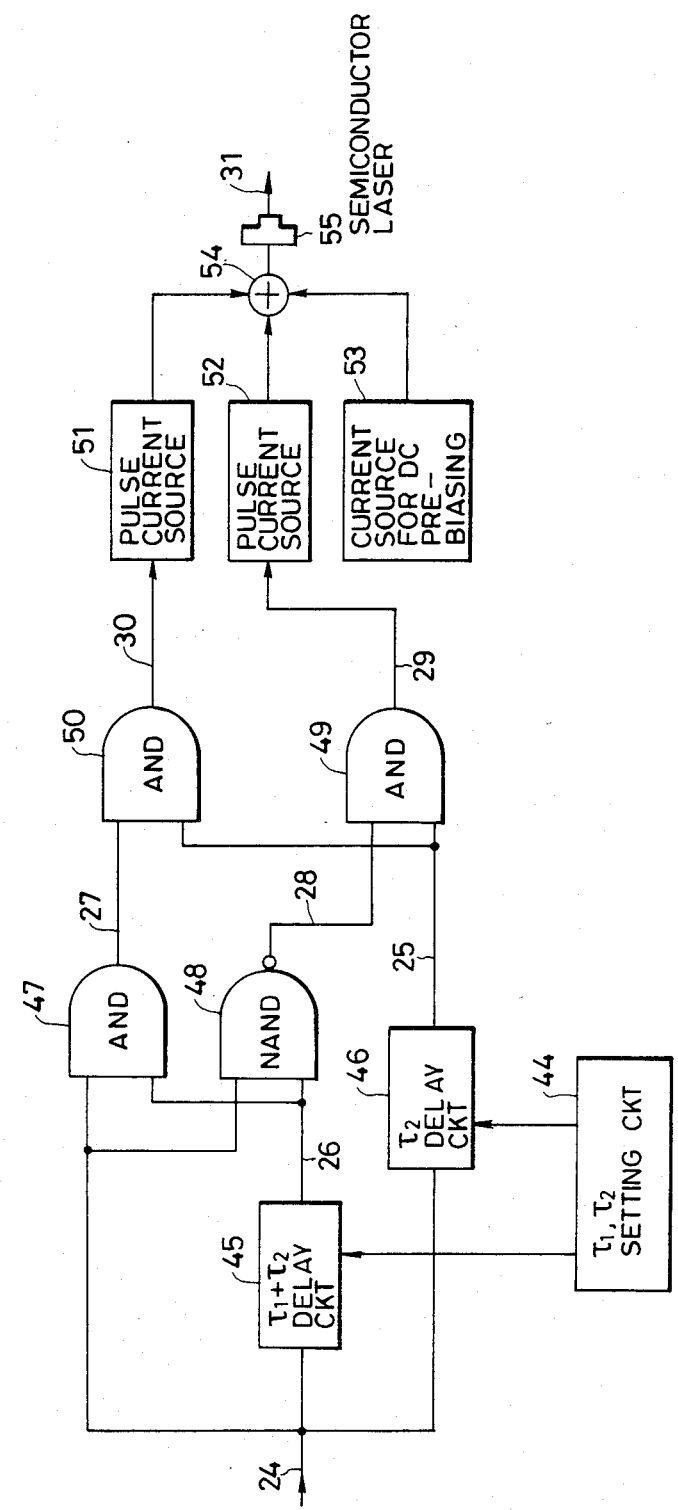
FIG. 5 is a block diagram of the circuit which performs the present invention.

Next, an example of a time chart for realizing the above method is shown in FIG. 4, and an example of circuit blocks for obtaining a laser output from an input modulation signal in accordance with this time chart is shown in FIG. 5. The circuit shown in FIG. 5 is constructed of two delay circuits 45 and 46, a circuit 44 for setting the delay times thereof, four logic circuits 47, 48, 49 and 50, two pulse current sources 51 and 52 each comprising a current switch which is operated by an input recording pulse, a current source for D.C. prebiasing 53, a current adder circuit 54, and a semiconductor laser 55.

Referring now to FIGS. 4 and 5, the operation of the circuit will be described. The delay times $\tau_1$ and $\tau_2$ are set by the delay time setting circuit 44, and an input modulation signal 24 is passed through the respective delay circuits 46 and 45 of the delay times $\tau_2$ and $(\tau_1+\tau_2)$ designated by the setting circuit 44, to obtain a $\tau_2$ delayed signal 25 and a $(\tau_1+\tau_2)$ delayed signal 26. Subsequently, the input modulation signal 24 and the $(\tau_1+\tau_2)$ delayed signal 26 are passed through the AND circuit 47 and the NAND circuit 48 to obtain a logic signal 27 and a logic signal 28 respectively. Further, the $\tau_2$ delay signal 25 and the logic signal 28 are passed through the AND circuit 49 to obtain a recording logic signal 29. Besides, the logic signal 27 and the $\tau_2$ delayed signal 25 are passed through the AND circuit 50 to obtain a recording logic signal 30.

The pulse current source 52 is switched with the recording logic signal 29, thereby to obtain a laser driving current in a waveform similar to that of the recording logic signal 29. Further, the pulse current source 51 is switched with the recording logic signal 30, and a pulse current is input to the current adder circuit 54, whereby a laser output 31 can be obtained. Herein, it is assumed possible to individually set the pulse current values of the pulse current sources 51 and 52 from outside. The semiconductor laser is assembled in an optical head including an optical system which focuses the laser output from the laser on the recording film of a rotating optical disc, a photodetection system which detects reflected light from the optical disc, and mechanisms which adjust the position of the laser beam on the optical disc (focusing control, tracking control). The construction of the whole optical disc device consisting of such an optical head, a moving mechanism therefor, etc. is described in detail in the official gazette of Japanese Patent Application Laid-open No. 58-91536.

As illustrated in FIG. 4, in the present embodiment, a run length limited coded signal composed of four kinds of pulse widths $P_1$, $P_2$, $P_3$ and $P_4$ (where $P_1 < P_2 < P_3 < P_4$ holds) was used as the input modulation signal 24. Here, the conditions of setting the pulse widths $\tau_1$ and $\tau_2$ of the respective pulses 7a and 7b of the front edge and rear edge of the laser output waveform shown in FIG. 3B are as follows:

$$\tau_1 \leq T_{MIN}/2 \quad (1)$$

and $$\tau_2 \leq T_{MIN}/2 \quad (2)$$

shall hold for the minimum recurrence pulse frequency $T_{MIN}$ of the input run length limited coded signal. (2) The reproduced waveform 4 with the front edge and rear edge of good symmetry as shown in FIG. 3A shall be obtained by the use of a laser pulse output having a pulse width in a range of:

$$\tau_1 \leq \tau_2 \leq T_1 \tau_1 + \tau_2$$

(where $2 T_1 \equiv T_{MIN}$ is put) or ($\tau_2 \leq \tau_1$) for a line speed (determined by the rotational frequency and recording radius of the disc) and recording pulse laser output power which have been set.

The pulse widths $P_1$, $P_2$, $P_3$ and $P_4$ of the input modulation coded signal 24 used in the present embodiment were as follows by way of example:

$P_1 = 150$ [nsec]
$P_2 = 200$ [nsec]
$P_3 = 250$ [nsec]
$P_4 = 300$ [nsec]

Here, $\tau_1$ and $\tau_2$ were set to be $\tau \equiv \tau_1 = \tau_2$.

$$\tau \leq 150 \text{ [nsec]}$$

was set on the basis of the setting condition (1), and further, $$\tau = 100 \text{ [nsec]}$$

was set on the basis of the setting condition (2).

The laser outputs 31 which were obtained with the above setting will be explained.

In response to input pulses 33 and 34 of the pulse widths $P_1 = 150$ [nsec] and $P_2 = 200$ [nsec] which are not shorter than $2\tau = 200$ [nsec] (in general, $\tau_1 + \tau_2$), recording pulses 37 and 38 which are merely delayed by $\tau_2$ and whose waveforms are not changed are respectively obtained as recording logic signals, and the laser outputs pulses 41 and 42 corresponding to the respective signals.

On the other hand, in response to input pulses 32 and 35 of the pulse widths $P_3 = 250$ [nsec] and $P_4 = 300$ [nsec] which are longer than $2\tau$ (in general, $\tau_1 + \tau_2$), waveforms 36 and 39 which are delayed by $\tau_2$ and each of which is changed to be composed of pulses 7a and 7b of the pulse widths $\tau$ on both the front edge side and rear edge side thereof (in general, a train of pulses of the pulse width $\tau_1$ on the front edge side and the pulse width $\tau_2$ on the rear edge side) and a time interval 8 are obtained as recording logic signals. As laser outputs, there are obtained pulse shapes 40 and 43 in which the output levels of the parts of the time intervals 8 can be varied by changing the pulse current level of the pulse current source 51.

The pit shapes and reproduced waveforms which were obtained will be explained.

With each of the laser output waveforms 41 and 42, the pit shape 3 and the reproduced waveform 4 as shown in FIG. 3A were obtained.

Besides, with each of the laser output waveforms 40 and 43, the pit shape 9 and the reproduced signal 10 as shown in FIG. 3B were obtained in a case where the current level of the pulse current source 51 was set to zero. On the other hand, the pit shape 13 and the reproduced waveform 14 as shown in FIG. 3C were obtained in a case where the current level was set to an appropriate finite value.

In this manner, whereas for the pulses 32 and 35 having the pulse widths longer than 200 [nsec], only the reproduced waveforms with the rises and decays of poor symmetry were obtained when the input run length limited coded signals were used as the laser outputs without any change, the reproduced waveforms with the rises and decays of good symmetry as shown in FIGS. 3A, 3B, 3C and 3D could be obtained by forming the laser outputs in such a way that the input run length limited coded signals were passed through the circuit shown in FIG. 5.

As another example for realizing this method, it is also allowed that laser output waveforms which correspond to respective pulses of various pulse widths constituting the input modulation signals are stored in a ROM (Read Only Memory) beforehand, whereupon they are output in synchronism with the input modulation signals.

Next, a method of reproducing signals recorded on an optical disc will be described.

FIG. 6A shows information recorded on a track 71. FIG. 6B shows the waveforms of analog signals provided from a reading-out optical head which moves along the track. The waveforms are digitized with a suitable threshold value 74 to obtain digitized signals as shown in FIG. 6C. The digitized signals are processed to reproduce the information. In this regard, the analog signal in FIG. 6B greatly fluctuates in the amplitude, shape etc. thereof, depending upon the respective conditions of recording and reproduction. Accordingly, when the threshold level 74 is fixed, it affects the shape of the digitized signal in FIG. 6C greatly. On the other hand, it is very difficult to promptly change the threshold level in accordance with the fluctuations. Consequently, the utilization of a system based on such reproduction is limited to a range in which the influence by the relative change of the threshold level is negligible. Therefore, the system has had the problem that the recording and reproduction of information at high density are difficult.

A reproducing method to be stated below consists in an information reproducing method which exerts no influence on the reproduction of information even when the corresponding relation between read-out analog signals and a threshold level for converting them into binary coded signals or multiple-level digitized signals has changed.

The principle of this reproducing method is based on the fact that the analog signal waveforms shown in FIG. 6B are expressed by the same shape (function) when only the rising parts and decaying parts thereof are examined. That is, the method utilizes the fact that the relationships between a threshold value for digitization and digitized signals reflect the functional shape of the waveforms and are accordingly regular, and it is characterized in that signals corresponding to the front edge and rear edge of recorded information are detected independently of each other and that timing signals are regenerated independently from the respective detected signals, whereupon data is reproduced on the basis of the timing signals.

FIG. 7 shows a first embodiment of the present reproducing method. It is a block arrangement diagram of a data reproducing circuit for performing the present reproducing method. Numeral 110 designates a reading-out head, from which an analog signal waveform 73 as shown in FIG. 8A is output in accordance with the recorded information of a medium (for example, a pit recorded in an optical disc). Numeral 111 designates a digitizing circuit, which provides a digitized pulse 75 shown in FIG. 8B on the basis of a threshold level 74 and the analog waveform 73 in FIG. 8A. A circuit 120 extracts a pulse 75-1 (FIG. 8C) corresponding to the rising part of the digitized pulse 75, while a circuit 130 extracts a pulse 75-2 (FIG. 8D) corresponding to the decaying part of the digitized pulse 75. In FIGS. 8C and 8D, the pulse 75-1 corresponds to the rising edge of the digitized pulse 75, and the pulse 75-2 to the decaying edge thereof, and these shall be called 'edge pulses' or 'data pulses'. Numerals 121 and 131 indicate timing regenerating circuits, for example, PLL (Phase Locked Loop) circuits respectively.

Successive clocks corresponding to the rise timing and decay timing of the digitized pulse 75 are respectively regenerated as the outputs of the rising edge detection circuit 120 and decaying edge detection circuit 130. Numerals 122 and 132 indicate data detection circuits, which decide the presence of the data pulses at the respective timings of the clocks regenerated by the PLL circuits 121 and 131. That is, in the circuit 122, the data pulse corresponding to the rising edge is decided with the clock prepared from the rising edge pulse. In the circuit 132, a similar process is performed for the decaying edge. Shown at numeral 140 is a circuit which synthesizes the processed results of the two edge pulses. It may be a mere register whose inputs are received by respective clock signals and whose output is delivered with eigher of the above clocks or a third clock. A decoder 150 decodes data from the above data series. A practicable example of a detection processing circuit for the rising edge pulse 75-1 or decaying edge pulse 75-2 is shown in FIG. 9. Numeral 112 denotes a gate having two, inverting and non-inverting outputs, numerals 122 and 132 denote filp-flops, numeral 142 denotes an OR gate, numeral 141 denotes a register, and numeral 143 denotes a clock signal. According to the embodiment of FIG. 7 described above, the rising and decaying edge pulses are individually processed. Therefore, even when the correlation between the read-out analog signal and the digitizing threshold level has fluctuated, the aspects of changes of the respective edge pulses can be deemed the same for continuous recorded information, and hence, data can be reproduced without being affected by the fluctuation.

A second embodiment of the present reproducing method is shown in FIG. 10. This embodiment differs from the embodiment of FIG. 7 in that data decoders are comprised for the rising edge and the decaying edge independently of each other. The decoders are respectively indicated by numerals 151 and 152 in FIG. 10. The other portions are the same as in the case of FIG. 7. The feature of the present embodiment is that, since the rise and decay are independently processed, they can be respectively regarded as independent data channels. That is, equivalently a channel formed of the rising edges and a channel formed of the decaying edges are multiplexed. Accordingly, the two channels can be used either independently or associatively.

Next, a third embodiment of the present reproducing method will be described. This makes use of the property that the two independent channels are given by the embodiment of FIG. 10. In recording and reproducing information, signals such as synchronizing signals and various marks are usually recorded together with data, and processing for reproducing the data is carried out on the basis of these signals. FIGS. 11A, 11B, 11C and 11D are diagrams for explaining the embodiment in which the present reproducing method is applied to a process for reproducing synchronizing signals. It is assumed that synchronous information items be recorded as indicated at 72-1, 72-2, 72-3, ... along a track 71 (FIG. 11A). Signals read out from the information items are digitized, and the digitized signals are shown in FIG. 11B. A train of edge pulses 75-11, 75-12, ... shown in FIG. 11C are obtained from the rising edges of the digitized pulses 75, while a train of edge pulses 75-21, 75-22, ... shown in FIG. 11D are obtained from the decaying edges. When each pulse train in FIG. 11C or FIG. 11D is viewed as a single set of synchronous information items, synchronizing signal pulses can be derived therefrom. Since, in this case, the synchronous information items are obtained from both of the pulse trains in FIGS. 11C and 11D, equivalently the synchronizing signals are written double, and a higher reliability of the synchronizing signals can be achieved. In addition, although a fixed time difference is sometimes involved between signals detected from the pulse trains in FIGS. 11C and 11D, the relation between the edge pulses 75-11 and 75-21 from certain specified recorded information, for example, 72-1 is not disordered, and hence, any contradiction is not caused by the time difference. Besides, in a case where all the patterns 72-1, 72-2, ... in FIG. 11A have the same shape, it is also possible to use an identical circuit as the decoders for the synchronous information. The practicable circuit arrangement of the present embodiment may be similar to that in FIG. 10. However, the decoders 151 and 152 shall be synchronizing signal detection circuits. A concrete example of synchronizing signal patterns and a concrete example of a detection system are described in, for example, the official gazette of Japanese Patent Application Laid-open No. 58-169341.

Next, a fourth embodiment of the present reproducing method will be described. Since, as stated above, the rising edges and decaying edges can be respectively deemed the independent data channels by handling them independently, an information recording method utilizing this property can exist. As regards the example of FIGS. 11A thru 11D, the pulse trains in FIGS. 11C and 11D are deemed independent data series. For example, the pulse 75-21 is the decaying edge of the recorded information 72-1, and the pulse 75-12 is the rising edge of the recorded information 72-2. Accordingly, it can never occur that the pulse 75-12 precedes the pulse 75-21 in time. Moreover, when the inverval between both the pulses has become shorter than a predetermined value, the pulses can no longer be derived as two signals on account of the resolution condition of the reading-out head. Accordingly, the two channels are independent in the range within which the resolution condition of the reading-out head is satisfied. There are a large number of solutions which meet this requirement. By way of example, a code pattern described in the aforementioned official gazette of Japanese Patent Application Laid-open No. 58-169341 can be employed (signals are modulated into a form usually called NRZI and then recorded).

Further, the present reproducing method is applicable to the detection of a specified mark as indicated in the official gazette of Japanese Patent Application Laid-open No. 58-169337.

As described above, according to the present reproducing method, in an apparatus wherein signals (a rising edge and a decaying edge) corresponding to the front edge and rear edge of a read-out signal from information recorded on an information recording medium are derived so as to reproduce data with a self-clocking method (a method in which a clock for the reproduction is regenerated from recorded data itself), both the signals are processed independently of each other. Therefore, even when the correlation between the read-out signal and a threshold level for digitization has fluctuated, the data reproduction is possible without being affected by the fluctuation, and a high-density data recording and reproducing system can be realized. Holding the relation of the read-out signal and the threshold level constant at all times is a very difficult subject in an optical disc system in which the conditions of recording and reproduction might fluctuate greatly. It is accordingly very effective to apply the present reproducing method to such systems. Furthermore, by processing the rising edges and decaying edges as two independent data channels, it becomes possible to achieve an enhanced reliability of recorded information, to adopt a special modulation system, and so forth.

We claim:

1. An optical recording method which includes modulating an intensity of a laser beam with an input modulation signal, and recording a signal on a recording medium by means of the modulated laser beam; comprising:

the step of forming two pulses respectively corresponding to a front edge part and a rear edge part of a pulse waveform of the input modulation signal; and the step of modulating the intensity of the laser beam with the two pulse waveforms.

2. An optical recording method according to claim 1, wherein said two pulses corresponding to said front edge and rear edge parts are caused to continue by a pulse whose pulse height is smaller than a pulse height of said two pulses.

3. An optical recording method according to claim 1, wherein at least one pulse is further existent between said two pulses corresponding to said front edge and rear edge parts.

4. A reproducing method for optical recording in which information is reproduced from a reproduced signal expressive of edges of the information recorded on a recording medium; comprising:

the step of detecting signals respectively corresponding to the front edge and rear edge of the information recorded on the recording medium;

the step of regenerating timing signals respectively from said signals corresponding to said front edge and rear edge; and the step of reproducing data by the use of said timing signals.

* * * * *